(No Model.)

F. M. & J. E. GOODHUE.
BICYCLE.

No. 485,187. Patented Nov. 1, 1892.

WITNESSES
Walter J. Gunthorp.
Virginia Milley

INVENTORS
Frank M. Goodhue
James E. Goodhue
BY Francis W. Parker
ATTORNEY

UNITED STATES PATENT OFFICE.

FRANK M. GOODHUE AND JAMES E. GOODHUE, OF ST. CHARLES, ILLINOIS.

BICYCLE.

SPECIFICATION forming part of Letters Patent No. 485,187, dated November 1, 1892.

Application filed February 16, 1892. Serial No. 421,670. (No model.)

*To all whom it may concern:*

Be it known that we, FRANK M. GOODHUE and JAMES E. GOODHUE, citizens of the United States, residing at St. Charles, in the county of Kane and State of Illinois, have invented a new and useful Improvement in Bicycles, of which the following is a specification.

Our invention relates to bicycles, and has for its object to provide means whereby the speed may be varied. It is illustrated in the accompanying drawings, wherein—

Figure 1:
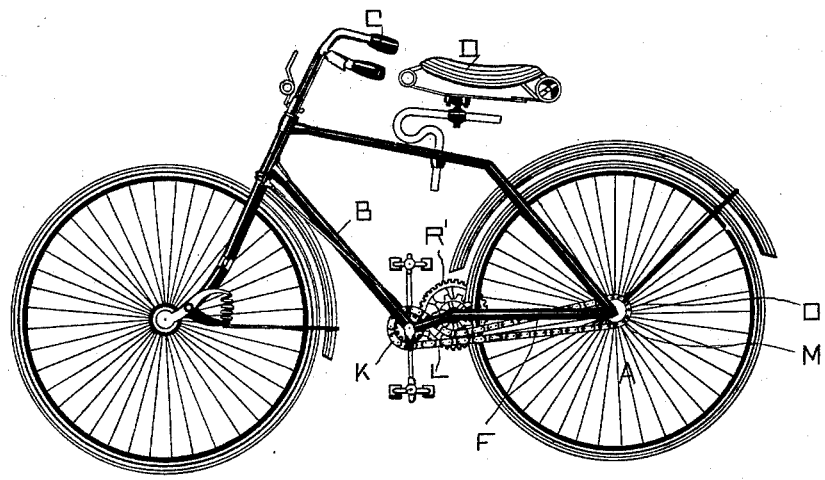
Figure 2:
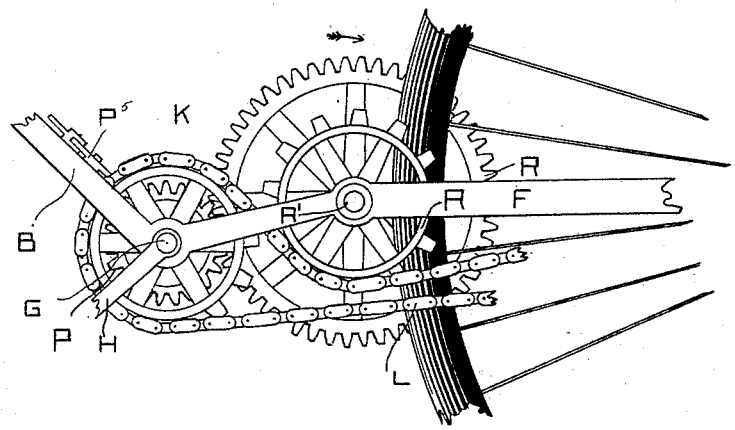
Figure 3:
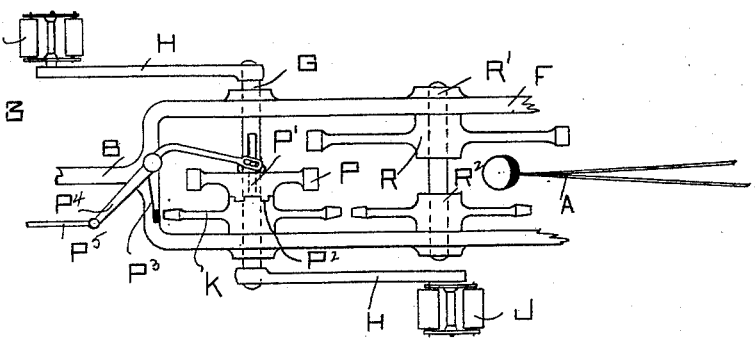

Figure 1 is a side view of a bicycle containing our improvement. Fig. 2 is a similar but enlarged view of the mechanism. Fig. 3 is a plan detail view of the drive mechanism.

Like parts are indicated by the same letter in all figures.

A A are the bicycle-wheels, connected and supported by the frame-piece B B B, upon which the controlling-handle C and the seat D are properly mounted.

F is a horizontal frame-piece in which the rear wheel is journaled and which is upwardly turned at its forward end and terminates in the frame-piece B. At the forward angle or toward the front portion of the frame F is journaled the short shaft G with the crank-arms H H, on which the pedals J J are pivoted. This is the driving-shaft, operated by the feet of the rider. Loose upon this shaft is the driving sprocket-wheel K, over which plays the driving-chain L, which also plays about the sprocket-wheel M on the axle O of the rear wheel A.

P is a combined gear-wheel and clutch feathered upon the shaft G at P' and adapted to slide back and forth upon such shaft, while always rotating with it.

The wheels P and K are provided with interlocking portions $P^2$, whereby they may be made to rotate together.

$P^3$ is a spring which normally keeps the wheel P against the wheel K; and $P^4$ is an elbow crank-lever adapted to retract the wheel P and controlled by means of the rod $P^5$ by the rider.

R is a gear-wheel on the shaft R', journaled in the frame F, and $R^2$ is a sprocket-wheel on the same shaft. The driving-chain L travels over the sprocket-wheel K and under the sprocket-wheel $R^2$ at all times, and the wheel P is either serving as a clutch to lock the wheel K to the shaft G or as a gear to engage the gear R, and thus drive the shaft R'. These parts may be greatly changed and altered in form and shape and relation without departing from the spirit of our invention.

The use and operation of our invention are as follows: In the normal operation of a bicycle the operation of the pedals will rotate the driving-shaft G, and since the sprocket-wheel K is rigid therewith, by reason of the engagement of the wheel P with the wheel K, the wheel K will be rotated with the driving-shaft and will operate the driving-chain L. Since this chain engages both the sprocket-wheel K and the sprocket-wheel M, the latter will be rotated and with it the axle of the rear wheel A, and thus the bicycle will be propelled. In the meantime the shaft R' is being rotated in the direction of the arrow by the engagement of the driving-chain L with the sprocket-wheel $R^2$ on such shaft. At such times this shaft is an idle though rotating shaft. If now it is desired by the rider to speed down—as, for example, in the event of approaching a hill or incline—it is easily accomplished by operating the rod $P^5$ to move the elbow crank-lever $P^4$ on its pivot and retract the wheel P, which up to that time has been acting as a clutch to operatively connect the wheel K with the shaft G, and by retracting it far enough against the spring $P^3$ it will be brought into engagement with the gear-wheel R, whereupon the latter will be set in motion, being driven by the wheel P. The relation of the parts is such that the wheel R will continue to rotate, though no longer idle, but now driven in the direction indicated by the arrow. The wheel $R^2$ will therefore not lock when continuing to travel in the same direction, but will now serve as a driving-wheel to impart to the chain L the same motion which it had before when driven by the wheel K. The relation of the gears as to size, however, is such that the wheel $R^2$ under the same speed of action of the pedals will rotate much slower under the new conditions than under the old conditions. Thus the same power put forth by the rider will continue to operate the machine, though slower, to correspond with the increased difficulty of propulsion incident to the effort to ride up the incline.

We claim—

1. The combination of bicycle wheels and frame with a driving-chain, two driving-wheels adapted to be connected therewith, driving connections from each driving-wheel to the pedal-shaft, and means for throwing the two driving-wheels alternately but not simultaneously in or out of driving connection with the chain.

2. The combination of bicycle wheels and frame with a driving-chain, two driving-wheels adapted to be connected therewith, driving connections from each driving-wheel to the pedal-shaft, and means for throwing the two driving-wheels alternately but not simultaneously in or out of driving connection with the chain, said driving-wheels adapted to impart different speeds to the driving-wheels, while the speed of the pedal-shaft remains constant.

3. The combination of bicycle-wheels and a frame therefor with a driving-chain, two driving-wheels continuously in engagement therewith, driving connections from the same to the pedal-shaft, and means for alternately but not simultaneously operatively connecting the driving-wheels with the pedal-shaft.

4. The combination of bicycle-wheels and a frame therefor with a driving-chain, two driving-wheels continuously in engagement therewith, driving connections from the same to the pedal-shaft, and means for alternately but not continuously operatively connecting the driving-wheels with the pedal-shaft, said driving-wheels adapted to impart different speeds to the bicycle-wheels, while the speed of the pedal-shaft remains constant.

5. In a bicycle, the combination of the pedal-shaft with two wheels thereon, one loose on the shaft, the other adapted to slide along but rotate with the shaft, with a second shaft carrying two wheels, one adapted to be put into engagement with the sliding wheel on the pedal-shaft, a driving-chain continuously in contact with the two remaining wheels and with a sprocket-wheel on the axle of the bicycle, a clutch device on the opposed surfaces of the two wheels on the pedal-shaft, and means for moving the sliding wheel so that it is alternately in engagement with the other wheel of the pedal-shaft or with the opposed wheel on the shaft, whereby power is communicated from the pedal-shaft to the bicycle-wheels by either of two transmitting connections.

FRANK M. GOODHUE.
JAMES E. GOODHUE.

Witnesses:
ALFRED ANDERSON,
DAVID S. WILSON.